US009559853B2

(12) United States Patent
Sato et al.

(10) Patent No.: US 9,559,853 B2
(45) Date of Patent: Jan. 31, 2017

(54) WIRELESS COMMUNICATION DEVICE, PROGRAM, AND WIRELESS COMMUNICATION SYSTEM

(75) Inventors: Masanori Sato, Tokyo (JP); Katsutoshi Itoh, Tokyo (JP); Tomoya Yamaura, Tokyo (JP); Hideyuki Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 571 days.

(21) Appl. No.: 13/350,054

(22) Filed: Jan. 13, 2012

(65) Prior Publication Data
US 2012/0191780 A1 Jul. 26, 2012

(30) Foreign Application Priority Data

Jan. 21, 2011 (JP) ................................ 2011-011416

(51) Int. Cl.
*H04L 12/12* (2006.01)
*H04W 76/02* (2009.01)
(Continued)

(52) U.S. Cl.
CPC .............. *H04L 12/12* (2013.01); *H04W 76/02* (2013.01); *H04W 8/005* (2013.01); *H04W 84/18* (2013.01)

(58) Field of Classification Search
None
See application file for complete search history.

(56) References Cited

U.S. PATENT DOCUMENTS 6,842,460 B1 * 1/2005 Olkkonen et al. ............ 370/465
7,412,518 B1 * 8/2008 Duigou et al. ................ 709/227
(Continued)

FOREIGN PATENT DOCUMENTS

JP 2002-055864 2/2002
JP 2006-217105 8/2006
(Continued)

OTHER PUBLICATIONS

Ververidis, C.N.; Polyzos, G.C., Service discovery for mobile Ad Hoc networks: a survey of issues and techniques, Communications Surveys & Tutorials, IEEE, Issue Date: Third Quarter 2008, Written by: Ververidis, C.N.; Polyzos, G.C.*
(Continued)

*Primary Examiner* — Greg C Bengzon
(74) *Attorney, Agent, or Firm* — Paratus Law Group, PLLC

(57) ABSTRACT

There is provided a wireless communication device including a wireless communication unit, a communication control unit configured to control a process of detecting a nearby wireless communication device by the wireless communication unit, a connection process to the nearby wireless communication device detected in the detection process, and communication of content data with the nearby wireless communication device connected in the connection process, and a storage unit that stores content data. The communication control unit, on the basis of information received from the nearby wireless communication device in the detection process, determines if one of the content data in the storage unit or content data in the nearby wireless communication device has been updated relative to the other, and controls the connection process performed when the update is determined.

13 Claims, 14 Drawing Sheets

(51) Int. Cl.
*H04W 8/00* (2009.01)
*H04W 84/18* (2009.01)

(56) References Cited

U.S. PATENT DOCUMENTS

| | | | |
|---|---|---|---|
| 7,590,086 B2* | 9/2009 | Olkkonen et al. | 370/328 |
| 7,616,594 B2* | 11/2009 | Roberts et al. | 370/310 |
| 7,814,195 B2* | 10/2010 | Dacosta | 709/224 |
| 7,881,315 B2* | 2/2011 | Haveson et al. | 370/401 |
| 8,160,495 B2* | 4/2012 | Khedouri et al. | 455/41.2 |
| 8,341,209 B2* | 12/2012 | Hinni et al. | 709/202 |
| 8,484,661 B2* | 7/2013 | Walsh | 719/318 |
| 8,572,034 B2* | 10/2013 | Crienen et al. | 707/621 |
| 8,620,213 B2* | 12/2013 | Mallinson et al. | 455/41.2 |
| 8,682,959 B2* | 3/2014 | Hinni et al. | 709/202 |
| 8,687,547 B2* | 4/2014 | Collingrige | 370/328 |
| 2006/0112143 A1* | 5/2006 | Subramanian | 707/104.1 |
| 2007/0283423 A1* | 12/2007 | Bradley et al. | 726/4 |
| 2007/0299681 A1* | 12/2007 | Plastina et al. | 705/1 |
| 2008/0031210 A1* | 2/2008 | Abhishek et al. | 370/338 |
| 2008/0134245 A1* | 6/2008 | DaCosta | 725/44 |
| 2008/0134256 A1* | 6/2008 | DaCosta | 725/62 |
| 2008/0235191 A1* | 9/2008 | Dijk | G06F 17/30038 |
| 2008/0250462 A1* | 10/2008 | Crohas | 725/74 |
| 2009/0181653 A1* | 7/2009 | Alharayeri | 455/414.1 |
| 2010/0208662 A1* | 8/2010 | Fuste Vilella et al. | 370/328 |
| 2010/0261507 A1* | 10/2010 | Chang et al. | 455/566 |
| 2010/0271995 A1* | 10/2010 | Seok et al. | 370/311 |
| 2010/0281178 A1* | 11/2010 | Sullivan | 709/231 |
| 2011/0009051 A1* | 1/2011 | Khedouri et al. | 455/3.06 |
| 2011/0034127 A1* | 2/2011 | Wentink | H04W 76/022 455/41.2 |
| 2011/0103264 A1* | 5/2011 | Wentink | H04W 8/005 370/255 |
| 2011/0142014 A1* | 6/2011 | Banerjee | H04L 63/0869 370/338 |
| 2011/0163939 A1* | 7/2011 | Tam et al. | 345/2.3 |
| 2011/0177802 A1* | 7/2011 | Gupta | H04L 12/66 455/418 |
| 2011/0205965 A1* | 8/2011 | Sprigg et al. | 370/328 |
| 2011/0275316 A1* | 11/2011 | Suumaki | G06K 7/10237 455/41.1 |
| 2011/0280234 A1* | 11/2011 | Wentink | 370/338 |
| 2011/0304685 A1* | 12/2011 | Khedouri et al. | 348/14.02 |
| 2012/0057456 A1* | 3/2012 | Bogatin | H04W 28/08 370/230.1 |
| 2012/0084341 A1* | 4/2012 | Mantri | H04L 67/1095 709/203 |
| 2012/0134287 A1* | 5/2012 | Turunen | H04W 4/06 370/252 |
| 2012/0135723 A1* | 5/2012 | Ramo | G06F 17/30867 455/418 |
| 2013/0012220 A1* | 1/2013 | Waris | H04L 12/12 455/450 |
| 2013/0227152 A1* | 8/2013 | Lee | H04W 48/16 709/227 |
| 2013/0281086 A1* | 10/2013 | Michaelis | H04W 48/08 455/426.1 |
| 2013/0290985 A1* | 10/2013 | Walsh | 719/318 |

FOREIGN PATENT DOCUMENTS

| | | |
|---|---|---|
| JP | 2007-013649 | 1/2007 |
| JP | 2007-104600 | 4/2007 |
| JP | 2009-521190 | 5/2009 |
| WO | WO2006/100843 | 9/2006 |

OTHER PUBLICATIONS

Haengrae Cho, An Update Propagation Algorithm for P2P File Sharing over Wireless Mobile Networks, Computational Science—ICCS 2007 Lecture Notes in Computer Science vol. 4490, 2007, pp. 753-760.*

Wi-Fi Certified Wi-Fi Direct™, Wi-Fi Alliance, Oct. 2010.*

Aug. 19, 2014, Japanese Office Action for related JP application No. 2011-011416.

* cited by examiner

WIRELESS COMMUNICATION DEVICE, PROGRAM, AND WIRELESS COMMUNICATION SYSTEM

BACKGROUND

The present disclosure relates to a wireless communication device, a program, and a wireless communication system.

Nowadays, in order to increase the usability of content data for users, sharing of content data among a plurality of user devices is being conducted. For example, when content data recorded on a stationary user device such as a home recorder is transmitted to a mobile user device such as a portable phone or a portable game machine, a user can enjoy the recorded content data even outside of his home.

Meanwhile, Wi-Fi Direct defined by the Wi-Fi Alliance proposes to form a communication group by determining which function of a master unit (a group owner) or a slave unit (a client) each of a plurality of wireless devices should have. Herein, the master unit operates as a simple access point, and has a function of connecting one or more slave units. Note that a wireless communication system that complies with such Wi-Fi Direct is described in, for example, JP 2010-245975A.

SUMMARY

In a wireless communication system such as the one described above, it is desired that the processes for allowing content data to be shared among a plurality of wireless devices as well as the power consumption be reduced.

In light of the foregoing, it is desirable to provide a wireless communication device, a program, and a wireless communication system that are novel and improved and that allow efficient sharing of content data.

According to an embodiment of the present disclosure, there is provided a wireless communication device including a wireless communication unit, a communication control unit configured to control a process of detecting a nearby wireless communication device by the wireless communication unit, a connection process to the nearby wireless communication device detected in the detection process, and communication of content data with the nearby wireless communication device connected in the connection process, and a storage unit that stores content data. The communication control unit, on the basis of information received from the nearby wireless communication device in the detection process, determines if one of the content data in the storage unit or content data in the nearby wireless communication device has been updated relative to the other, and controls the connection process performed when the update is determined.

The information received in the detection process may be attribute information including an identifier and the last update time of the content data in the nearby wireless communication device.

The wireless communication device may further include a hash processing unit configured to hash attribute information of the content data stored in the storage unit. The attribute information received from the nearby wireless communication device in the detection process may have been hashed, and the communication control unit may determine the presence or absence of an update by comparing the hashed attribute information received in the detection process with the attribute information hashed by the hash processing unit.

The attribute information may be communicated using an extension field of a Service_Discovery_Query in procedures of Service_Discovery defined in Wi-Fi Direct.

The storage unit may further store history information indicating the last point in time when content data was communicated with the nearby wireless communication device, and the communication control unit may identify the nearby wireless communication device from a device ID included in the information received in the detection process, and determine if the content data in the storage unit has been updated since the last point in time concerning the nearby wireless communication device indicated by the history information.

The wireless communication unit may, when the communication control unit has determined the presence of an update, transmit to the nearby wireless communication device update notification information indicating the presence of the update, and the communication control unit may control the connection process in accordance with a connection request transmitted from the nearby wireless communication device based on reception of the update notification information.

The update notification information may be communicated using an extension field of a Service_Discovery_Query in procedures of Service_Discovery defined in Wi-Fi Direct.

The wireless communication unit may, when the communication control unit has determined the presence of an update, transmit a connection request to the nearby wireless communication device, and the communication control unit may control the connection process started upon transmission of the connection request.

The wireless communication unit may operate as a master unit of a wireless network, and the wireless communication unit may, when the communication control unit has determined the presence of an update, request the nearby wireless communication device to join the wireless network.

The wireless communication device may further include a notification unit configured to, when the communication control unit has determined the presence of an update, notify the user of the update, and the communication control unit may control the connection process in accordance with a check operation of the user performed in response to the notification of the update.

The communication control unit may start the detection process in accordance with an instruction of a user to start the detection process.

The communication control unit may start the detection process at a timing specified by the user.

The communication control unit may start the detection process at predetermined intervals.

According to another embodiment of the present disclosure, there is provided a program for causing a computer to function as a wireless communication unit, a communication control unit configured to control a process of detecting a nearby wireless communication device by the wireless communication unit, a connection process to the nearby wireless communication device detected in the detection process, and communication of content data with the nearby wireless communication device connected in the connection process, and a storage unit that stores content data. The communication control unit, on the basis of information received from the nearby wireless communication device in the detection process, determines if one of the content data in the storage unit or content data in the nearby wireless communication device has been updated relative to the other, and controls the connection process performed when the update is determined.

According to further another embodiment of the present disclosure, there is provided a wireless communication system including a first wireless communication device, and a second wireless communication device. The second wireless communication device includes a wireless communication unit, a communication control unit configured to control a process of detecting the first wireless communication device by the wireless communication unit, a connection process to the first wireless communication device detected in the detection process, and communication of content data with the first wireless communication device connected in the connection process, and a storage unit that stores content data. The communication control unit, on the basis of information received from the first wireless communication device in the detection process, determines if one of the content data in the storage unit or content data in the first wireless communication device has been updated relative to the other, and controls the connection process performed when the update is determined.

According to still another embodiment of the present disclosure, there is provided a wireless communication device including a wireless communication unit, a communication control unit configured to control a process of detecting a nearby wireless communication device by the wireless communication unit, a connection process to the nearby wireless communication device detected in the detection process, and communication of content data with the nearby wireless communication device connected in the connection process, and a storage unit that stores content data. The communication control unit, on the basis of information transmitted from the wireless communication unit to the nearby wireless communication device in the detection process, controls the connection process performed when one of the content data in the storage unit or content data in the nearby wireless communication device has been updated relative to the other.

As described above, according to the present disclosure, a plurality of wireless communication devices can efficiently share content data.

DETAILED DESCRIPTION OF THE EMBODIMENTS

Figure 1:
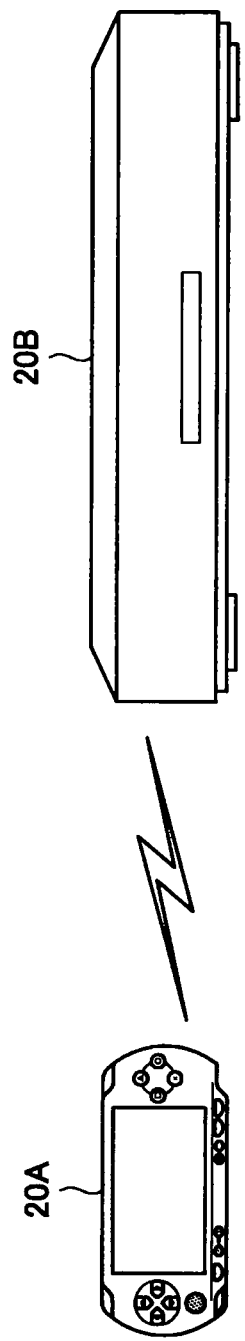
FIG. 1 is an explanatory diagram showing the configuration of a wireless communication system in accordance with an embodiment of the present disclosure.

Hereinafter, embodiments of the present disclosure will be described in detail with reference to the appended drawings. Note that, in this specification and the appended drawings, structural elements that have substantially the same function and structure are denoted by the same reference numerals, and repeated explanation of these structural elements is omitted.

In addition, in this specification and the drawings, a plurality of structural elements that have substantially the same function and structure and are denoted by the same reference numerals may be followed by different alphabets for distinction purposes. However, when there is no need to particularly distinguish between each of the plurality of structural elements that have substantially the same function and structure, only reference numerals are assigned.

The "DETAILED DESCRIPTION OF THE EMBODIMENTS" will be described in accordance with the following order.

1. Configuration of Wireless Communication System
2. Hardware Configuration of Wireless Device
3. Description of Each Embodiment
   3-1. First Embodiment (Configuration of Wireless Device) (First Operation Example) (Second Operation Example)
   3-2. Second Embodiment
   3-3. Third Embodiment
4. Conclusion <1. Configuration Of Wireless Communication System>

The present disclosure can be carried out in various forms as exemplarily described in detail in "3-1. First Embodiment" to "3-3. Third Embodiment." A wireless communication system (1) in accordance with each embodiment includes a plurality of wireless communication devices (wireless devices 20), and each wireless communication device includes:

A. a wireless communication unit (220),

B. a communication control unit (240) that controls a process of detecting a nearby wireless communication device by the wireless communication unit, a connection process to the nearby wireless communication device detected in the detection process, and communication of content data with the nearby wireless communication device connected in the connection process, and C. a storage unit (230) that stores content data, where D. the communication control unit determines if one of the content data in the storage unit or content data in the nearby wireless communication device has been updated relative to the other on the basis of information received from the nearby wireless communication device in the detection process, and controls the connection process performed when the update is determined.

Hereinafter, such a basic configuration common to each embodiment will be described first with reference to FIG. 1.

FIG. 1 is an explanatory diagram showing the configuration of a wireless communication system 1 in accordance with an embodiment of the present disclosure. As shown in FIG. 1, the wireless communication system 1 in accordance with an embodiment of the present disclosure includes a plurality of wireless devices 20A and 20B.

The wireless device 20B is, for example, a stationary home recorder as shown in FIG. 1, and has the acquired content data stored therein. The wireless device 20B can acquire television programs as content data by, for example, receiving a television system such as BS (Broadcast Satellite) broadcasting, CS (communications satellite) broadcasting, terrestrial digital broadcasting, terrestrial analog broadcasting, or cable broadcasting.

Note that the content data is not limited to television programs. For example, the content data can be audio data of music, lectures, or radio programs; video data of movies, video programs, photographs, documents, pictures, or charts; games; or software.

The wireless device 20B can communicate wirelessly with the wireless device 20A. Specifically, the wireless device 20B forms a communication group with the wireless device 20A in accordance with Wi-Fi Direct defined by the Wi-Fi Alliance, and can communicate wirelessly with the wireless device 20A in the formed communication group without using an access point. Note that even when the wireless device 20A and the wireless device 20B are connected to the same access point (AP), they can communicate directly with each other using IEEE802.11z (TDLS), for example.

The wireless device 20A is a mobile game machine as shown in FIG. 1, and reproduces the stored content data. For example, the wireless device 20A can share content data stored in the wireless device 20B by communicating wirelessly with the wireless device 20B. Accordingly, a user can enjoy the content data acquired by the wireless device 20B even outside of his home.

Although FIG. 1 shows a game machine as an example of the wireless device 20A and shows a home recorder as an example of the wireless device 20B, the wireless devices 20 are not limited to such examples. For example, the wireless device 20 can be an information processing device such as a PC (Personal Computer), a home game machine, a household electrical appliance, a portable phone, a PHS (Personal Handyphone System), a portable music reproducing device, or a portable image processing device.

The wireless device 20A, in order to share content data with the wireless device 20B as described above, determines if the content data in the wireless device 20B has been updated through communication of information, and the content data is communicated when the update is determined. However, there are several problems with the determination of if the content data has been updated. Hereinafter, such problems will be briefly described with reference to FIG. 2 and FIG. 3.

First, as there are restrictions on the power of a mobile device like the wireless device 20A, it is not realistic to always connect the wireless devices 20A and 20B for communicating information about an update to the content data. Therefore, in a first comparative example, if the content data has been updated is determined in accordance with the procedures shown in FIG. 2 in response to a user operation.

Figure 2:
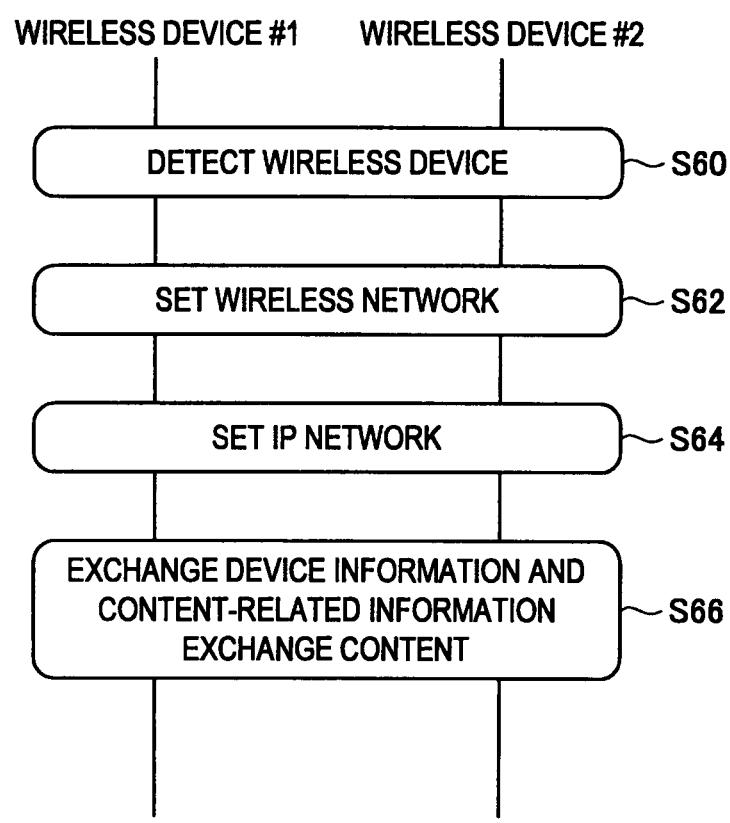
FIG. 2 is an explanatory diagram showing the procedures of a determination of if content data has been updated in accordance with a first comparative example.

FIG. 2 is an explanatory diagram showing the procedures of a determination of if the content data has been updated in accordance with the first comparative example. As shown in FIG. 2, wireless devices #1 and #2 in accordance with the first comparative example mutually detect the presence of each other (S60), set a wireless network (S62), and set an IP network (S66). Then, the wireless devices #1 and #2 determine if the content data has been updated by communicating the device information and information related to the content data, and, if it is determined that the content data has been updated, communicate the updated content data (S66).

As described above, in the first comparative example, an IP network should be set for communicating information related to the content data. However, in the first comparative example, an IP network is set even when there is no update to the content data. Thus, it has been difficult to provide a comfortable usage environment for users.

Figure 3:
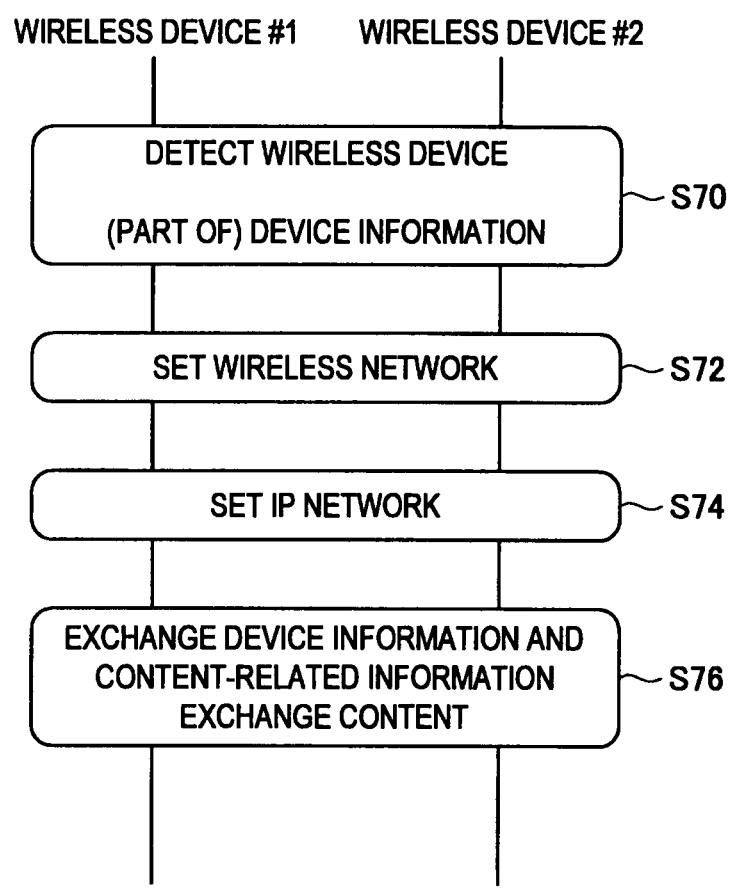
FIG. 3 is an explanatory diagram showing the procedures of a determination of if content data has been updated in accordance with a second comparative example.

FIG. 3 is an explanatory diagram showing the procedures of a determination of if the content data has been updated in accordance with a second comparative example. The determination procedures in accordance with the second comparative example comply with Wi-Fi Direct, and the wireless devices #1 and #2 in accordance with the second comparative example can communicate information for purposes other than wireless network construction in accordance with procedures called Service Discovery at the stage of wireless device detection (S70).

However, information, which is defined in the specification, for purposes other than wireless network construction, is a service (e.g., a server or a PC) that can be provided by each wireless device 20. Therefore, even in the second comparative example that complies with Wi-Fi Direct, information related to the content data is communicated (S76) after the setting of a wireless network (S72) and the setting of an IP network (S74). Therefore, as in the first comparative example, the second comparative example has a problem in that setting of a wireless network and an IP network that is not originally needed, is undesirably performed.

Thus, the inventors have arrived at each embodiment of the present disclosure, focusing on the aforementioned circumstances. According to each embodiment of the present disclosure, if the content data has been updated can be determined before the setting of a wireless network and an IP network. Thus, a plurality of wireless devices 20 can efficiently share the content data. Hereinafter, an exemplary hardware configuration of such a wireless device 20 will be described first, and then each embodiment of the present disclosure will be described in detail.

<2. Hardware Configuration Of Wireless Device>

Figure 4:
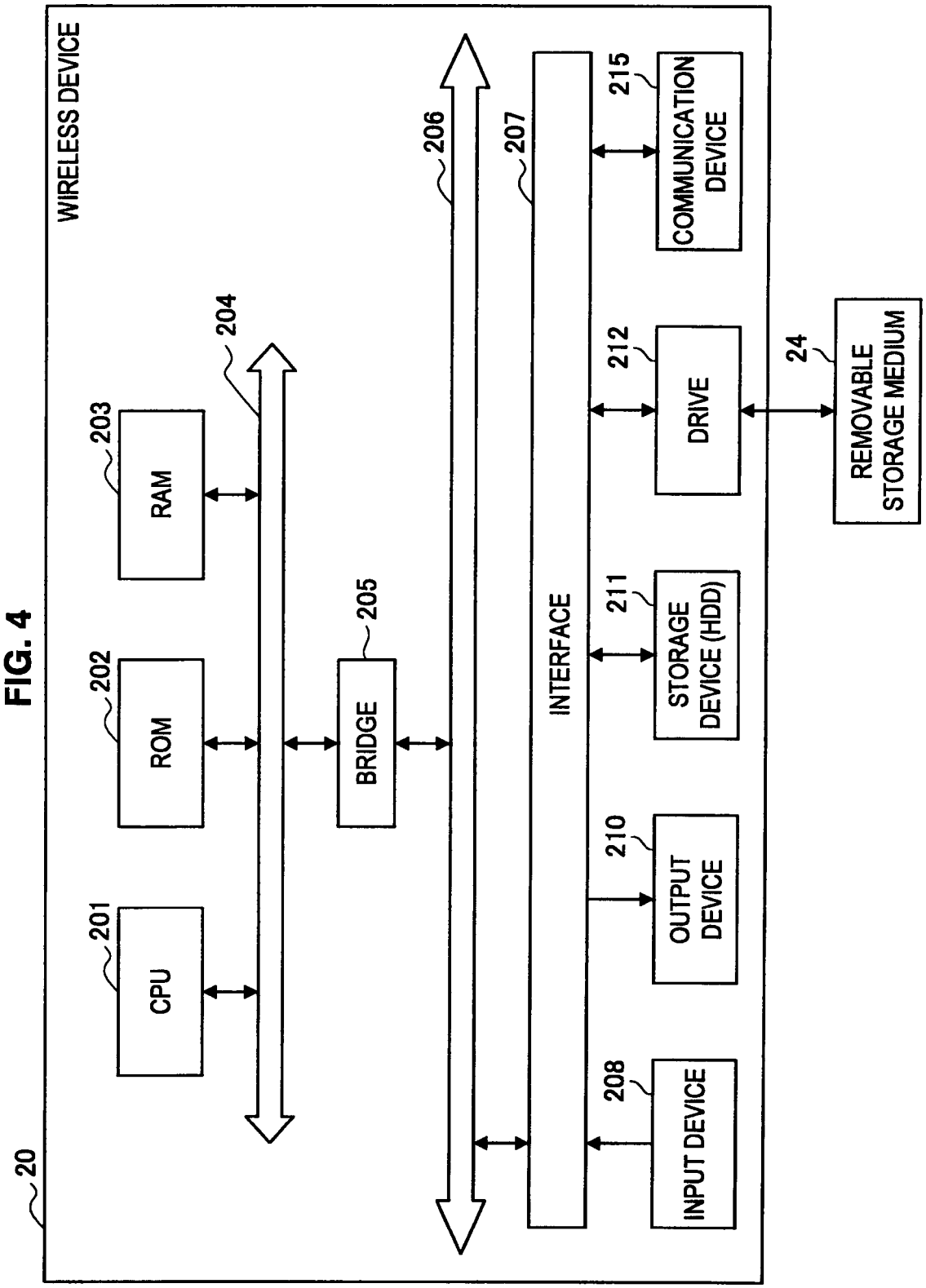
FIG. 4 is a block diagram showing the hardware configuration of a wireless device.

FIG. 4 is a block diagram showing the hardware configuration of the wireless device 20. The wireless device 20 includes a CPU (Central Processing Unit) 201, ROM (Read Only Memory) 202, RAM (Random Access Memory) 203, and a host bus 204. In addition, the wireless device 20 includes a bridge 205, an external bus 206, an interface 207, an input device 208, an output device 201, a storage device (HDD) 211, a drive 212, and a communication device 215.

The CPU 201 functions as an arithmetic processing unit and a control unit, and controls the entire operation within the wireless device 20 in accordance with various programs.

The CPU 201 can be a microprocessor. The ROM 202 stores programs, operation parameters, and the like used by the CPU 201. The RAM 203 temporarily stores programs used in the execution of the CPU 201, parameters that change as appropriate during the execution, and the like. Such units are mutually connected via the host bus 204 including a CPU bus or the like.

The host bus 204 is connected to the external bus 206 such as a PCI (Peripheral Component Interconnect/Interface) bus via the bridge 205. Note that the host bus 204, the bridge 205, and the external bus 206 need not be arranged separately, and the functions of such components can be integrated into a single bus.

The input device 208 includes an input means for a user to input information such as a mouse, a keyboard, a touch panel, a button, a microphone, a switch, or a lever; an input control circuit that generates an input signal on the basis of a user input and outputs the signal to the CPU 201; and the like. A user of the wireless device 20 can input various data to the wireless device 20 or instruct the wireless device 20 to perform a processing operation by operating the input device 208.

The output device 210 includes a display device such as, for example, a CRT (Cathode Ray Tube) display device, a liquid crystal display (LCD) device, an OLED (Organic Light Emitting Diode) device, or a lamp. Further, the output device 210 includes an audio output device such as a speaker or a headphone. The output device 210 outputs the reproduced content, for example. Specifically, the display device displays various information such as reproduced video data by means of text or images. Meanwhile, the audio output device converts the reproduced audio data or the like into audio and outputs the audio.

The storage device 211 is a device for storing data, constructed as an example of a storage unit of the wireless device 20 in accordance with this embodiment. The storage device 211 can include a storage medium, a recording device that records data on a storage medium, a reading device that reads data from a storage medium, a deletion device that deletes data recorded on the storage medium, and the like. The storage device 211 includes, for example, a HDD (Hard Disk Drive). The storage device 211 stores programs and various data for driving the hard disk and executed by the CPU 201.

The drive 212 is a reader/writer for a storage medium, and is incorporated in or externally attached to the wireless device 20. The drive 212 reads information recorded on a removable storage medium 24 such as a magnetic disk, an optical disc, a magnetooptical disk, or semiconductor memory that is mounted, and outputs the information to the RAM 203. The drive 212 can also write information to the removable storage medium 24.

The communication device 215 is, for example, a communication interface including a communication device or the like for connection to a nearby wireless device 20. The communication device 215 can be any of a communication device compatible with a wireless LAN (Local Area Network), a communication device compatible with LTE (Long Term Evolution), or a wire communication device that performs wire communication.

<3. Description Of Each Embodiment>

The hardware configuration of the wireless device 20 in accordance with an embodiment of the present disclosure has been described above. Next, each embodiment of the present disclosure will be specifically described with reference to FIG. 5 to FIG. 15.

[3-1. First Embodiment]

(Configuration of Wireless Device)

Figure 5:
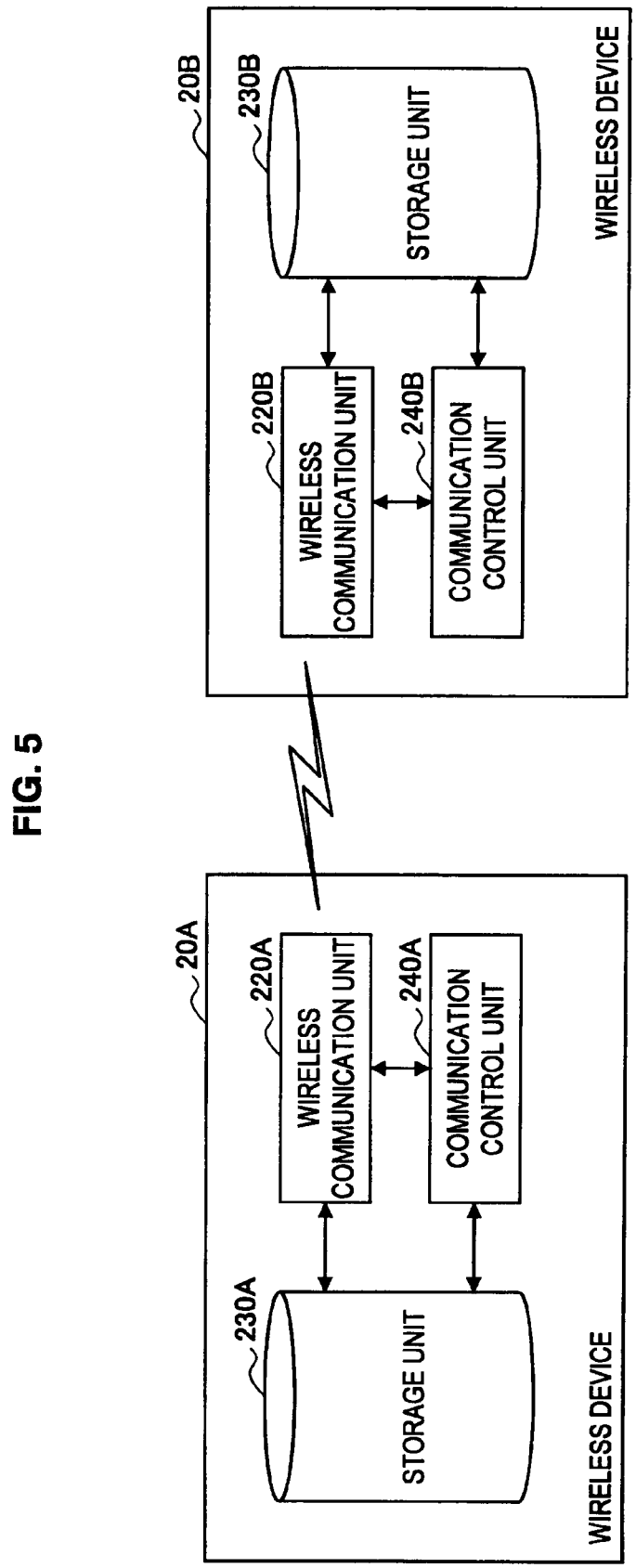
FIG. 5 is a functional block diagram showing the configuration of a wireless device in accordance with a first embodiment of the present disclosure.

FIG. 5 is a functional block diagram showing the configurations of the wireless devices 20A and 20B in accordance with a first embodiment of the present disclosure. As shown in FIG. 5, the wireless device 20A in accordance with the first embodiment includes a wireless communication unit 220A, a storage unit 230A, and a communication control unit 240A. Likewise, the wireless device 20B includes a wireless communication unit 220B, a storage unit 230B, and a communication control unit 240B.

The wireless communication unit 220A of the wireless device 20A performs, in accordance with control by the communication control unit 240A, communication for detecting the nearby wireless device 20B, communication for establishing wireless connection with the detected wireless device 20B, and communication of content data with the wireless device 20B.

Specifically, the wireless communication unit 220A, in the wireless device detection process for detecting the nearby wireless device 20B, transmits a response-requesting signal called "probe request," and receives a response signal called "probe response," for example.

For example, when the wireless communication unit 220A is the transmitting end of a probe request, the wireless communication unit 220A can detect the presence of the nearby wireless device 20B by receiving a probe response, which responds to the probe request, from the nearby wireless device 20B. Meanwhile, when the wireless communication unit 220A has received a probe request from the nearby wireless device 20B, the wireless communication unit 220A detects the presence of the wireless device 20B by the reception, and transmits a probe response responding to the probe request, whereby it becomes also possible for the wireless device 20B to detect the presence of the wireless device 20A.

In addition, the wireless communication unit 220A, in the wireless device detection process, communicates information about an update to the content data with the wireless device 20B using the procedures of Service_Discovery defined in Wi-Fi Direct, for example.

In the procedures of Service_Discovery, one of wireless devices transmits a service query signal called "Service_Discovery_Query," and the other wireless device returns a service response signal called "Service_Discovery_Response." Herein, exemplary structures of a Service_Discovery_Query frame and a Service_Discovery_Response frame will be described with reference to FIG. 6 and FIG. 7.

Figure 6:
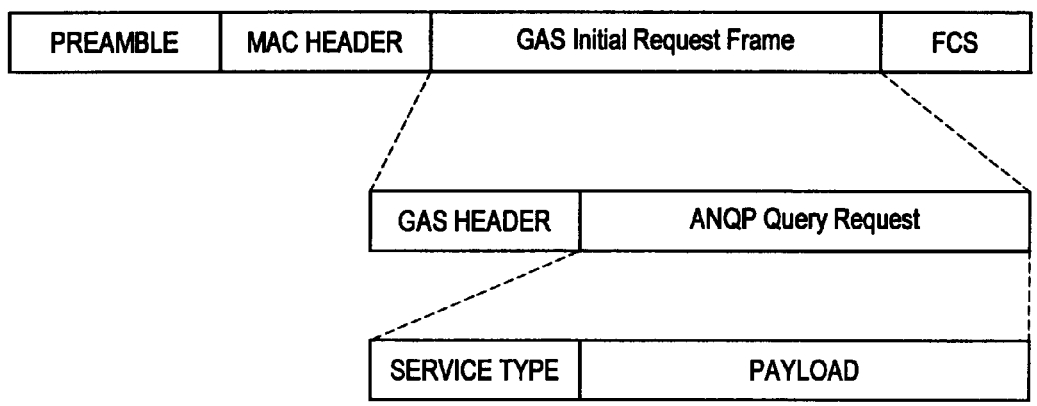
FIG. 6 is an explanatory diagram showing an exemplary structure of a Service_Discovery_Query frame.

FIG. 6 is an explanatory diagram showing an exemplary structure of a Service_Discovery_Query frame. As shown in FIG. 6, the Service_Discovery_Query frame includes a preamble having a signal pattern of a process, a MAC header including address information such as a source address or a destination address, a GAS (Generic Advertisement Services)_Initial_Request_Frame defined as a request frame to another wireless device 20, and an FCS (Frame Check Sequence) for detecting errors in the frame. In addition, the GAS_Initial_Request_Frame includes a GAS header and an ANQP (Access_Network_Query_Protocol)_Query_Request.

Herein, the ANQP_Query_Request in accordance with an embodiment of the present disclosure, which will be described in detail below, can include information for determining if one of the content data in the wireless device 20A or the content data in the wireless device 20B has been updated relative to the other. For example, a service type corresponding to an update to the content data is described in the service type included in the ANQP_Query_Request, and information related to the content data in the transmission-source wireless device 20 is described in the payload.

Figure 7:
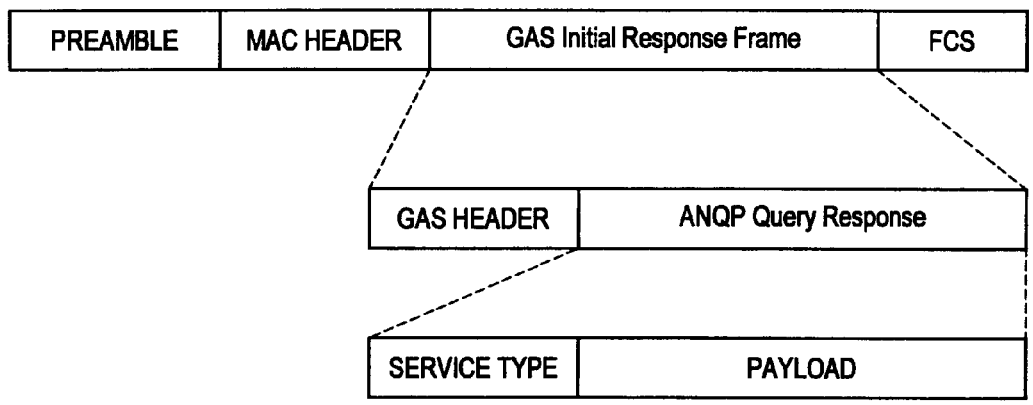
FIG. 7 is an explanatory diagram showing an exemplary structure of a Service_Discovery_Response frame.

FIG. 7 is an explanatory diagram showing an exemplary structure of a Service_Discovery_Response frame. As shown in FIG. 7, the Service_Discovery_Response frame includes a preamble having a signal pattern of a process, a MAC header including address information such as a source address or a destination address, a GAS_Initial_Response_Frame defined as a response frame to a request from another wireless device 20, and an FCS for detecting errors in the frame. In addition, the GAS_Initial_Response_Frame includes a GAS header and an ANQP (Access_Network_Query_Protocol)_Query_Response.

Herein, the ANQP_Query_Response in accordance with an embodiment of the present disclosure can include information indicating if one of the content data in the wireless device 20A or the content data in the wireless device 20B has been updated relative to the other. For example, a service type corresponding to an update to the content data can be described in the service type included in the ANQP_Query_Response, and update notification information indicating if the content data has been updated can be described in the payload.

Referring again to FIG. 5, the configuration of the wireless device 20A will be described. The storage unit 230A of the wireless device 20A stores content data while associating the content data with the attribute information related thereto. Examples of the attribute information include an identifier, a title, and the last update time of the content data. This attribute information is updated simultaneously with the update of the content data. With regard to attribute information of the regularly broadcast news programs or dramas, for example, identification information of the content data need not be updated, and the last update time can be updated to the new broadcast date and time.

Note that the storage unit 230A that stores such attribute information and content data can be a storage medium such as nonvolatile memory, a magnetic disk, an optical disc, or a MO (Magneto Optical) disk. Examples of the nonvolatile memory include EEPROM (Electrically Erasable Programmable Read-Only Memory) and EPROM (Erasable Programmable ROM). Examples of the magnetic disk include hard disks and disk-shaped magnetic bodies. Examples of the optical disc include CD (Compact Disc), DVD-R (Digital Versatile Disc Recordable), and BD (Blu-Ray Disc™).

The communication control unit 240A controls a wireless device detection process performed by the wireless communication unit 220A, a connection process for establishing wireless connection, communication of content data, and the like. The communication control unit 240A controls (starts) the aforementioned connection process when the wireless device 20A or the nearby wireless device 20B determines that the content data has been updated in the wireless device detection process. The method of determining if the content data has been updated and a method of starting a connection process will be described in detail below with reference to the drawings.

Like the wireless communication unit 220A of the wireless device 20A, the wireless communication unit 220B of the wireless device 20B performs, in accordance with control by the communication control unit 240B, communication for detecting the nearby wireless device 20A, communication for establishing wireless connection with the detected wireless device 20A, and communication of content data with the wireless device 20B. In addition, the wireless communication unit 220B, in the wireless device detection process, communicates information about an update to the content data using the aforementioned procedures of Service_Discovery defined in Wi-Fi Direct, for example. With the procedures of Service_Discovery, the communication control unit 240B of the wireless device 20B can determine if the content data has been updated before establishing a connection with the wireless device 20A.

Like the storage unit 230A of the wireless device 20A, the storage unit 230B of the wireless device 20B stores content data while associating the content data with the attribute information related thereto. Note that the storage unit 230B can store history information indicating the last point in time when communication was performed with the wireless device 20A for updating the content data.

The communication control unit 240B controls a wireless device detection process performed by the wireless communication unit 220B, a connection process for establishing wireless connection, communication of content data, and the like. The communication control unit 240B controls (starts) the aforementioned connection process when the wireless device 20B or the nearby wireless device 20A determines that the content data has been updated in the wireless device detection process. Such a configuration can prevent the wireless devices 20A and 20B from being connected pointlessly when there is no update to the content data.

(First Operation Example)

The configuration of the wireless device 20 in accordance with the first embodiment of the present disclosure has been described above. Next, a first operation example of the wireless device 20 in accordance with the first embodiment of the present disclosure will be described with reference to FIG. 8 to FIG. 11.

Figure 8:
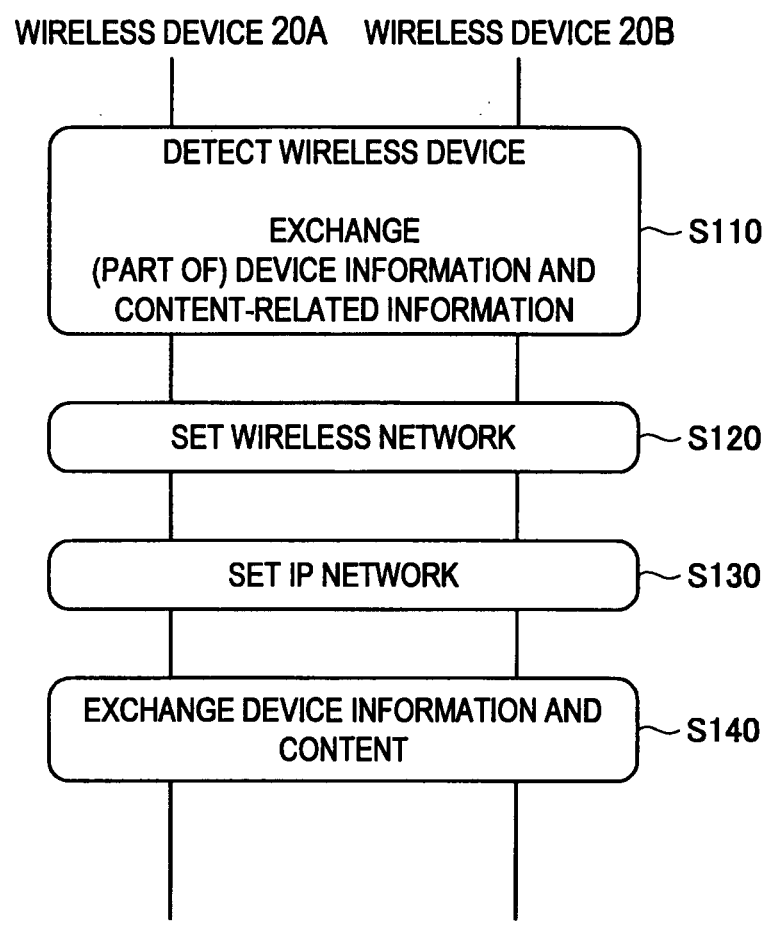
FIG. 8 is a sequence diagram showing the overall operation of a wireless device in accordance with a first embodiment of the present disclosure.

FIG. 8 is a sequence diagram showing the overall operation of the wireless device 20 in accordance with the first embodiment of the present disclosure. As shown in FIG. 8, the wireless devices 20A and 20B in accordance with the first embodiment perform wireless device detection (S110), perform cipher setting and an authentication process (e.g., WPS, 4way_hand_shake) to set a wireless network (S120) and set an IP network (S130), and then exchanges the content data for updating purposes (S140).

What is notable here is that the wireless devices 20A and 20B communicate information related to the content data at the stage of wireless device detection, and, when it is determined on the basis of this information that the content data has been updated, the process proceeds to the connection process of and following S120. Hereinafter, such process at the stage of wireless device detection will be specifically described.

Figure 9:
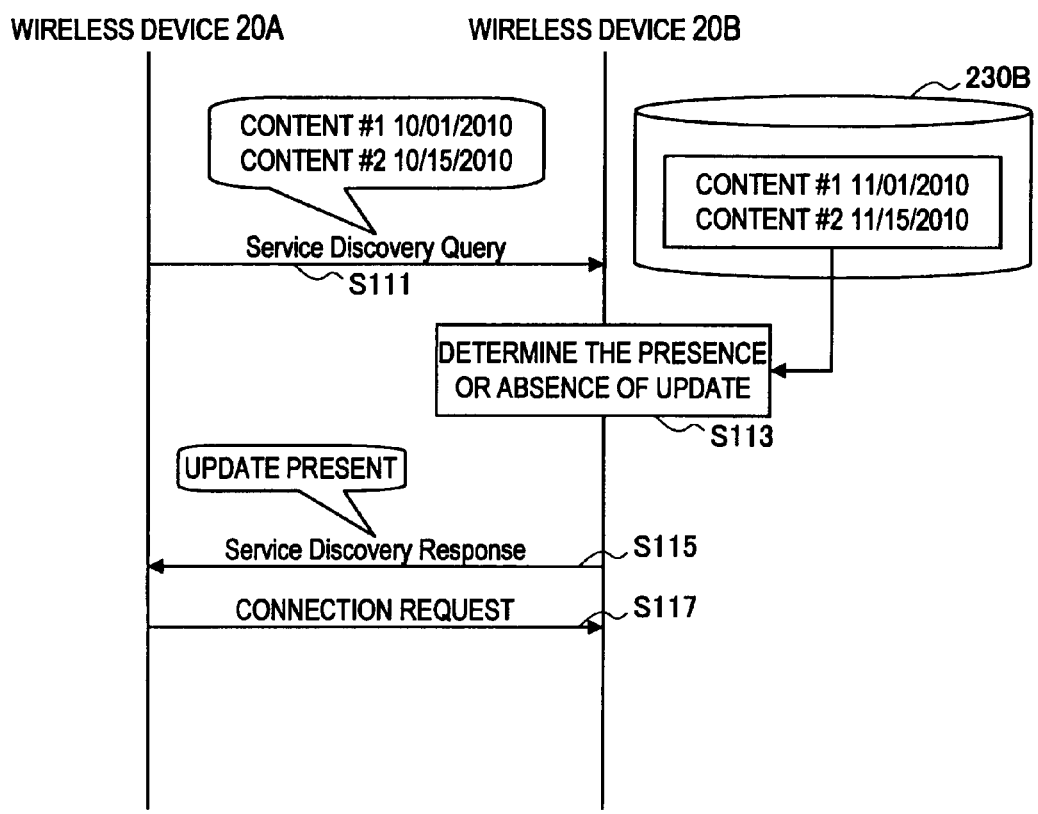
FIG. 9 is a sequence diagram showing the wireless device detection in accordance with a first operation example of a wireless device.

FIG. 9 is a sequence diagram showing the wireless device detection in accordance with the first operation example of the wireless device 20. As shown in FIG. 9, the wireless device 20A transmits a Service_Discovery_Query, which contains described in its service type information indicating an update service in accordance with an embodiment of the present disclosure, and contains described in its payload attribute information of the content data stored in the storage unit 230A (S111).

The communication control unit 240B of the wireless device 20B, upon receiving the Service_Discovery_Query from the wireless device 20A, compares the attribute information described in the payload with the attribute information of the content data stored in the storage unit 230B. Then, the communication control unit 240B of the wireless device 20B, when both the attribute information match, determines that there has been no update, and when both the attribute information do not match, determines that there has been an update (S113). In the example shown in FIG. 9, the attribute information of each of the content #1 and the content #2 differ in the last update time. Thus, the communication unit 240B of the wireless device 20B determines that the content data has been updated.

In this case, the communication control unit 240B of the wireless device 20B causes a Service_Discovery_Response, which contains described in its service type information indicating an update service in accordance with an embodiment of the present disclosure, and contains described in its payload information to the effect that there has been an update, to be transmitted from the wireless communication unit 220B (S115). Then, the wireless device 20A, as the payload of the Service_Discovery_Response describes information to the effect that there has been an update, transmits a connection request to the wireless device 20B (S117). Then, setting of a wireless network and an IP network is performed so that the updated content data is transmitted from the wireless device 20B to the wireless device 20A.

Such a configuration can prevent the wireless devices 20A and 20B from being connected pointlessly when there is no update to the content data. Thus, the power consumption can be reduced. Further, the power consumption can be further reduced by starting wireless device detection in accordance with any of the following rules or a combination thereof.

Rule 1: Start wireless device detection in response to an explicit instruction of a user to start detection.

Rule 2: Start wireless device detection at timing (e.g., eight o'clock AM) specified by a user.

Rule 3: Perform wireless device detection at regular intervals.

Although an example in which a determination of the presence of an update is performed in the stationary wireless device 20B has been described above, the subject that determines the presence of an update is not limited to the wireless device 20B. For example, the wireless device 20B can transmit a Service_Discovery_Query to the mobile wireless device 20A so that a determination of the presence of an update can be performed in the wireless device 20A.

In addition, although an example in which content data is updated in the stationary wireless device 20B and the updated content data is transmitted from the wireless device 20B to the wireless device 20A has been described above, this embodiment is not limited thereto. For example, content data can be updated in the mobile wireless device 20A so that the updated content data can be transmitted from the wireless device 20A to the wireless device 20B.

Herein, when the wireless device 20B already operates as a master unit (e.g., a group owner in Wi-Fi Direct), a slave unit typically transmits a connection request for setting a wireless network or the like. Therefore, even when the wireless device 20B has transmitted a Service_Discovery_Response shown in S115 of FIG. 9, the wireless device 20B should wait for a connection request from the wireless device 20A to start setting of a wireless network or the like. In view of such point, the operation example shown in FIG. 9 can be modified as shown below.

Figure 10:
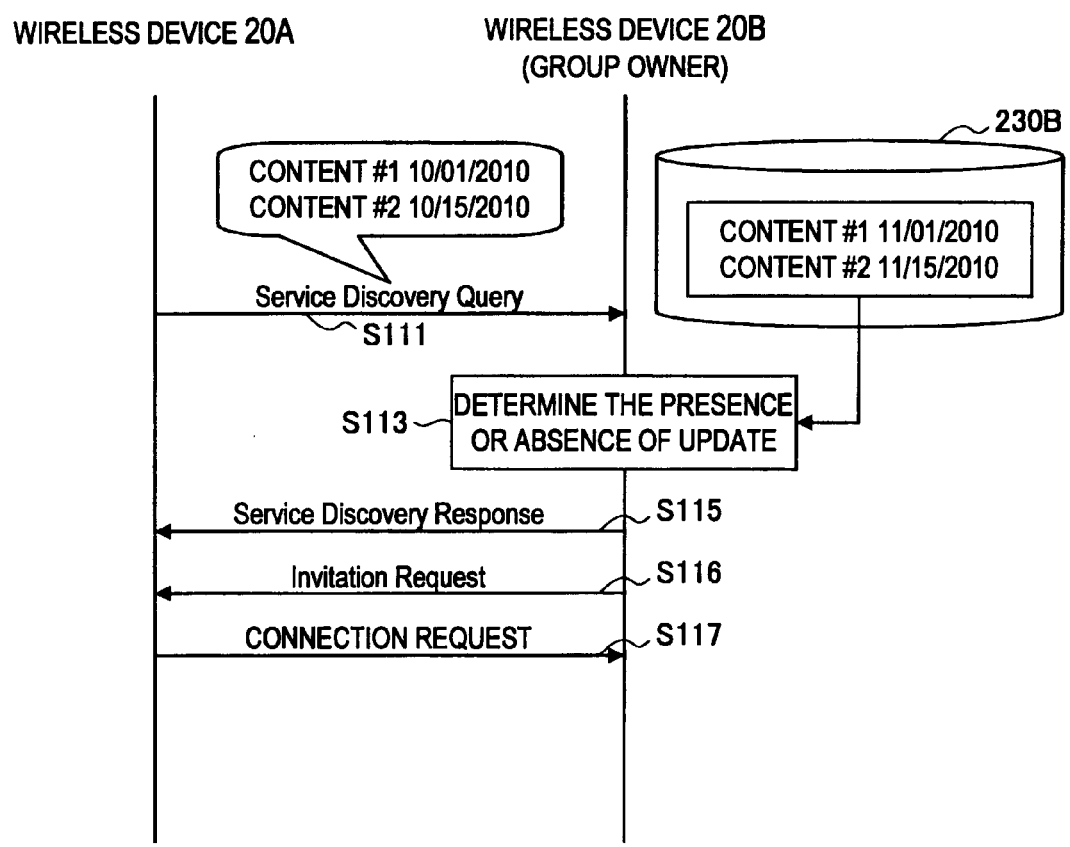
FIG. 10 is an explanatory diagram showing a variation of the wireless device detection in accordance with the first embodiment.

FIG. 10 is an explanatory diagram showing a variation of the wireless device detection in accordance with the first embodiment. S111, S113, and S115 in the wireless device detection in accordance with this variation are substantially identical to the steps shown in FIG. 9. However, in S115 in accordance with this variation, information indicating if there has been an update need not be transmitted with the Service_Discovery_Response because S116 described below is added.

The wireless device 20B, after transmitting a Service_Discovery_Response in S115, transmits an Invitation Request to the wireless device 20A to request the wireless device 20A to join a wireless network (S116). This Invitation Request is a frame defined by Wi-Fi Direct. The wireless communication device 20A, upon receiving the Invitation Request, transmits an Invitation Response, which is similarly defined by Wi-Fi Direct, to the wireless communication device 20B (S117). The Invitation Response includes information indicating whether to accept the Invitation Request, and the wireless communication device 20A transmits a connection request to the wireless device 20B in the case of accepting the Invitation Request (S118). Such a configuration can reduce the time till the setting of a wireless network is started.

By the way, the wireless device 20B can determine if all pieces of the content data stored in the storage unit 230B have been updated, or can determine if only content data specified by a user has been updated. A user can specify (register and add) the content data to be checked for update in accordance with the procedures shown in FIG. 11, for example.

Figure 11:
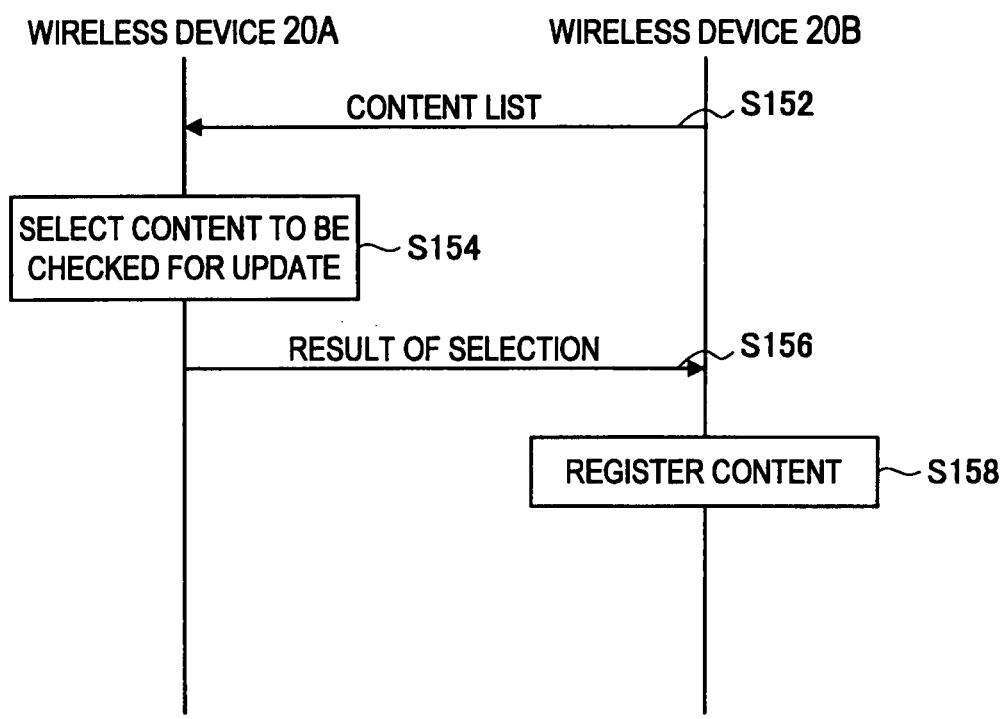
FIG. 11 is an explanatory diagram showing a specific example of a process of registering the content data to be checked for update.

FIG. 11 is an explanatory diagram showing a specific example of a process of registering the content data to be checked for update. As shown in FIG. 11, the wireless device 20B first transmits a content list indicating the content data stored in the storage unit 230B to the wireless device 20A (S152).

Then, a user selects the content to be checked for update from the content list in the wireless device 20A (S154), and the wireless device 20A transmits the result of selection by the user to the wireless device 20B (S156). Then, the wireless device 20B registers the content selected by the user as the target to be checked for update (S158).

(Second Operation Example)

In the first operation example, an example in which the wireless device 20A transmits attribute information of content data using a "Service_Discovery_Query" has been described. In the second operation example, if the content data has been updated can be determined in the wireless device 20B without transmission of the attribute information. Hereinafter, such a second operation example will be described with reference to FIG. 12.

Figure 12:
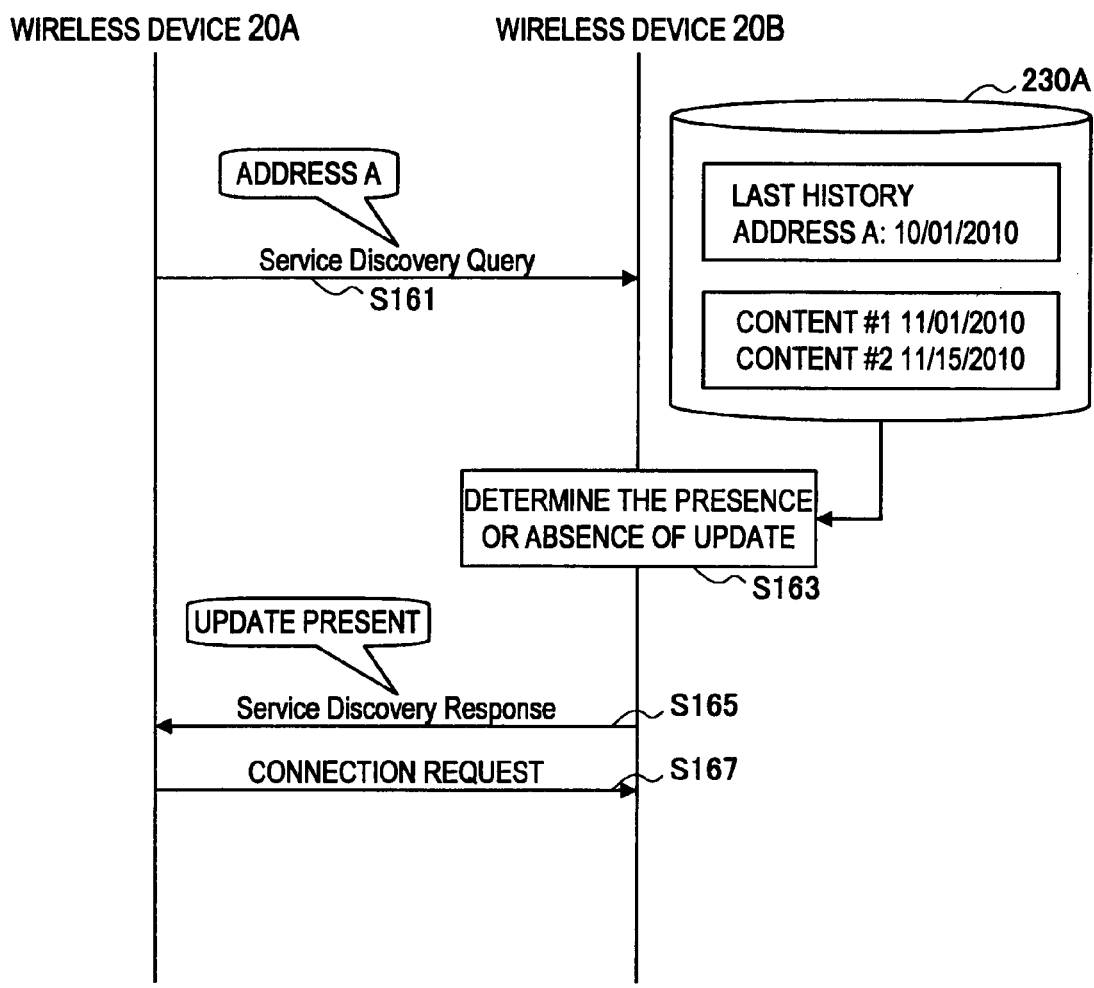
FIG. 12 is a sequence diagram showing the wireless device detection in accordance with a second operation example of a wireless device.

FIG. 12 is a sequence diagram showing the wireless device detection in accordance with the second operation example of the wireless device 20. As shown in FIG. 12, the wireless device 20A first transmits a Service_Discovery_Query to the wireless device 20B (S161). Herein, the Service_Discovery_Query includes a MAC header as shown in FIG. 6, and the MAC header contains described therein the address of the transmission-source wireless device 20A (e.g., a device ID such as a MAC address). In addition, the service type of the Service_Discovery_Query contains described therein information indicating an update service in accordance with an embodiment of the present disclosure.

Meanwhile, the wireless device 20B stores history information indicating the last point in time when content data was communicated with the wireless device 20A. This wireless device 20B, upon receiving the Service_Discovery_Query containing described therein the address of the wireless device 20A in S161, refers to the history information to determine if the content data in the storage unit 230B has been updated after the last communication with the wireless device 20A (S163). In the example shown in FIG. 12, the last date and time when communication with the wireless device 20A was performed is "Oct. 1, 2010" while the last update date and time of the content #1 and #2 is after "Oct. 1, 2010." Thus, the wireless device 20B determines that there has been an update.

In this case, the communication control unit 240B of the wireless device 20B causes a Service_Discovery_Response, which contains described in its service type information indicating an update service in accordance with an embodiment of the present disclosure, and contains described in its payload information to the effect that there has been an update, to be transmitted from the wireless communication unit 220B (S165). Then, the wireless device 20A, as the payload of the Service_Discovery_Response describes information to the effect that there has been an update, transmits a connection request to the wireless device 20B (S167). Then, setting of a wireless network and an IP network is performed so that the updated content data is transmitted from the wireless device 20B to the wireless device 20A.

[3-2. Second Embodiment]

The first embodiment of the present disclosure has been described above. Next, a second embodiment of the present disclosure will be described with reference to FIG. 13 and FIG. 14.

Figure 13:
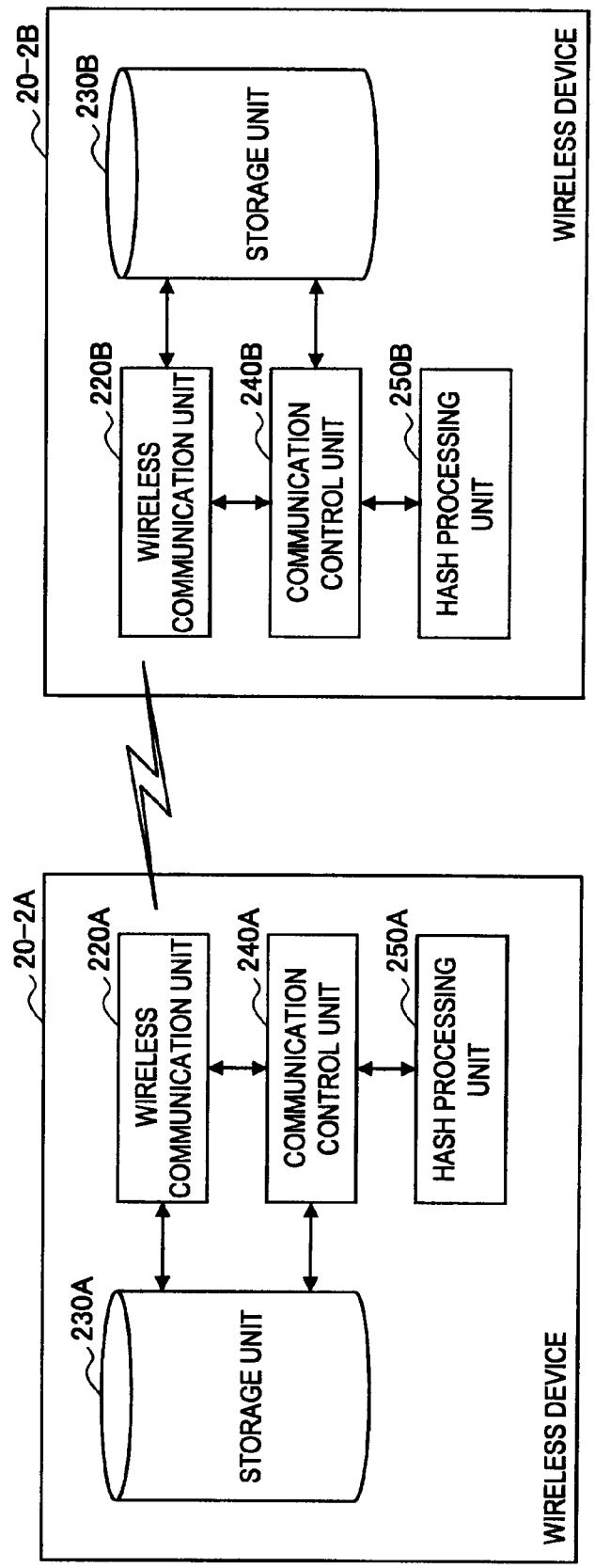
FIG. 13 is a functional block diagram showing the configuration of a wireless device in accordance with a second embodiment of the present disclosure.

FIG. 13 is a functional block diagram showing the configurations of wireless devices 20-2A and 20-2B in accordance with the second embodiment of the present disclosure. As shown in FIG. 13, the wireless device 20-2A in accordance with the second embodiment includes a wireless communication unit 220A, a storage unit 230A, a communication control unit 240A, and a hash processing unit 250A. Likewise, the wireless device 20-2B includes a wireless communication unit 220B, a storage unit 230B, a communication control unit 240B, and a hash processing unit 250B.

The hash processing unit 250A of the wireless device 20-2A hashes the attribute information of content data stored in the storage unit 230A. The wireless communication unit 220A transmits a Service_Discovery_Query, which contains described therein the attribute information hashed by the hash processing unit 250A, to the wireless device 20-2B.

The hash processing unit 250B of the wireless device 20-2B hashes the attribute information of content data stored in the storage unit 230B. The communication control unit 240B determines the presence or absence of an update by comparing the hashed attribute information contained in the Service_Discovery_Query received from the wireless device 20-2A with the attribute information hashed by the hash processing unit 250B. Hereinafter, the operation of such wireless devices 20-2 in accordance with the second embodiment will be specifically described.

Figure 14:
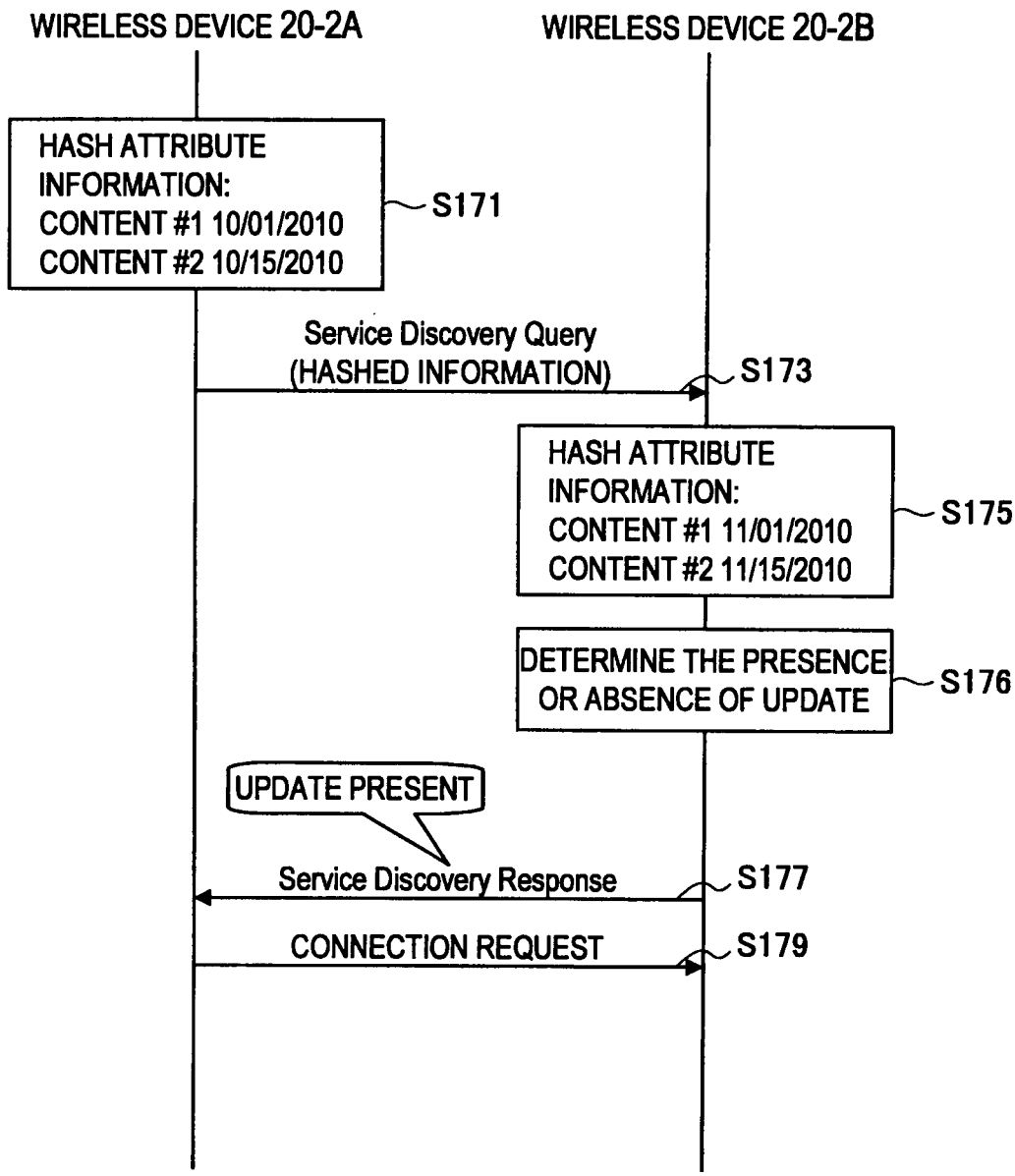
FIG. 14 is a sequence diagram showing the operation of a wireless device in accordance with the second embodiment.

FIG. 14 is a sequence diagram showing the operation of the wireless devices 20-2 in accordance with the second embodiment. As shown in FIG. 14, the hash processing unit 250A of the wireless device 20-2A first hashes the attribute information of the content data stored in the storage unit 230A (S171). Then, the wireless communication unit 220A of the wireless device 20-2A transmits a Service_Discovery_Query containing the attribute information hashed by the hash processing unit 250A to the wireless device 20-2B.

Meanwhile, the hash processing unit 250B of the wireless device 20-2B hashes the attribute information of the content data stored in the storage unit 230B (S175). Then, the communication control unit 240B, if the hashed attribute information contained in the Service_Discovery_Query matches the attribute information hashed in S175, determines that there has been no update, and, if the attribute information do not match, determines that there has been an update (S176). In the example shown in FIG. 14, different attribute information are hashed in S171 and S175. Thus, the communication control unit 240B determines that the content data has been updated.

In this case, the communication control unit 240B of the wireless device 20B causes a Service_Discovery_Response, which contains described in its service type information indicating an update service in accordance with an embodiment of the present disclosure, and contains described in its payload information to the effect that there has been an update, to be transmitted from the wireless communication unit 220B (S177). Then, the wireless device 20A, as the payload of the Service_Discovery_Response describes information to the effect that there has been an update, transmits a connection request to the wireless device 20B (S179). Then, setting of a wireless network and an IP network is performed so that the updated content data is transmitted from the wireless device 20B to the wireless device 20A.

As described above, according to the second embodiment of the present disclosure, hashed attribute information of the content data is communicated. Thus, confidentiality of the communicated data can be ensured and the volume of the communicated data can be suppressed.

[3-3. Third Embodiment]

The second embodiment of the present disclosure has been described above. Next, a third embodiment of the present disclosure will be described with reference to FIG. 15.

Figure 15:
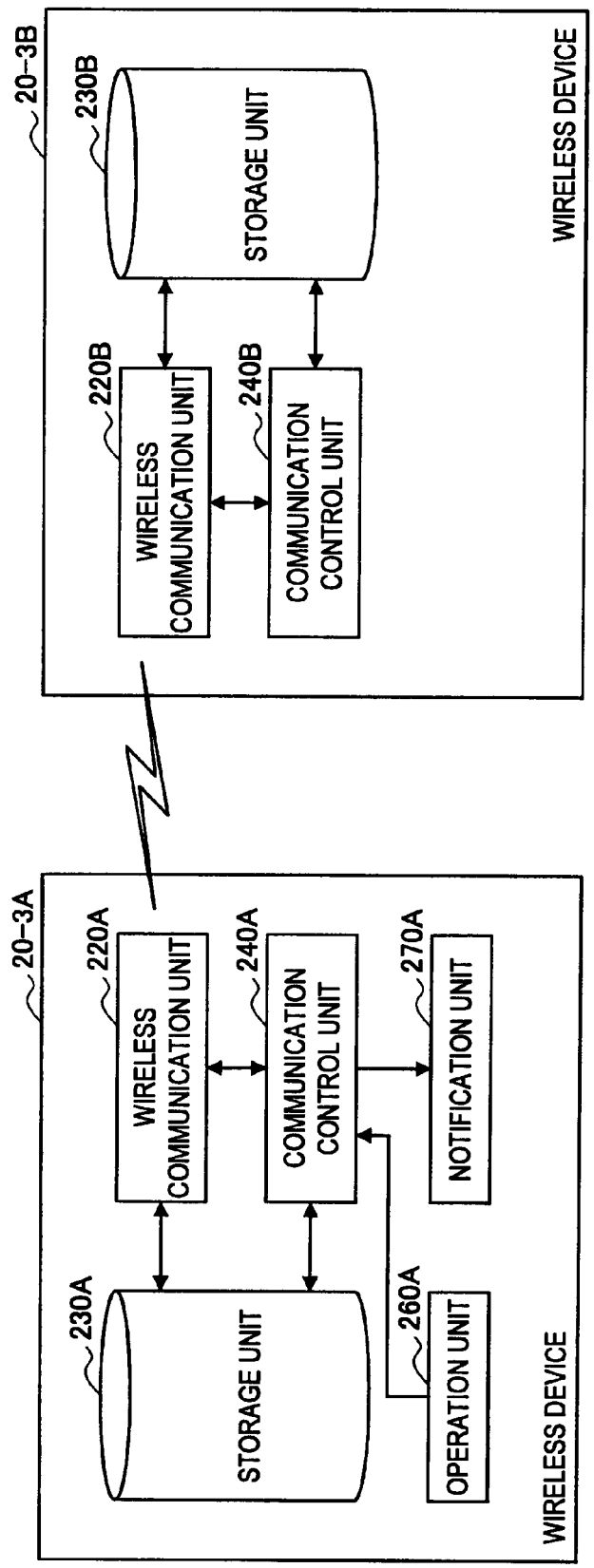
FIG. 15 is a functional block diagram showing the configuration of a wireless device in accordance with a third embodiment of the present disclosure.

FIG. 15 is a functional block diagram showing the configurations of wireless devices 20-3 in accordance with the third embodiment of the present disclosure. As shown in FIG. 15, a wireless device 20-3A in accordance with the third embodiment includes a wireless communication unit 220A, a storage unit 230A, a communication control unit 240A, an operation unit 260A, and a notification unit 270A. In addition, a wireless device 20-3B includes a wireless communication unit 220B, a storage unit 230B, and a communication control unit 240B.

The operation unit 260A is a configuration for a user to perform an operation, and can be a touch panel, a button, a switch, a lever, or a dial, for example.

When the notification unit 270A receives from the wireless device 20-3B a Service_Discovery_Response containing described therein information to the effect that there has been an update to the content data, the notification unit 270A notifies a user that an update should be performed. For example, the notification unit 270A can notify a user through audio, video, vibration, or the like.

The communication control unit 240A can, when a user has operated the operation unit 260A to permit a connection in response to the notification by the notification unit 270A, start a connection with the wireless device 20-3B, and control the communication of the content data after the connection is established. Note that the notification unit 270A can also notify the user after completion of the communication of the content data performed for updating purposes.

As described above, according to the third embodiment of the present disclosure, a connection process can be started by reflecting the intention of a user. Note that whether notifying a user and permission of a user are needed can be switchable by the advanced setting by the user.

Although an example in which the operation unit 260 and the notification unit 270 are mounted on the wireless device 20-3A has been described above, the operation unit 260 and the notification unit 270 can be mounted on the wireless device 20-3B, or the operation unit 260 and the notification unit 270 can be mounted on each of the wireless devices 20-3A and 20-3B.

4. CONCLUSION

As described above, the wireless device 20 in accordance with the embodiment of the present disclosure, when one of content data in the wireless device 20 or content data in a nearby wireless device 20 has been updated relative to the other, performs a connection process to the nearby wireless device 20. Such a configuration can prevent a plurality of wireless devices 20 from being connected pointlessly when there is no update to the content data, and thus allows a reduction in the power consumption.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, the steps in the process of the wireless device 20 in this specification need not necessarily be processed in a time-series order in accordance with the order described in the sequence diagram. For example, the steps in the process of the wireless device 20 can be performed in an order different from that described in the sequence diagram, or be processed in parallel.

It is also possible to create a computer program for causing hardware incorporated in the wireless device 20, such as the CPU 201, the ROM 202, and the RAM 203, to exert a function that is equivalent to each of the aforementioned configurations of the wireless device 20. In addition, a storage medium having the computer program stored therein is also provided.

The present disclosure contains subject matter related to that disclosed in Japanese Priority Patent Application JP 2011-011416 filed in the Japan Patent Office on Jan. 21, 2011, the entire content of which is hereby incorporated by reference.

What is claimed is:

1. A wireless communication device comprising:
a computer-readable storage medium configured to store content data including a previous attribute information described in an attribute of previous content data; and
circuitry configured to
control a process of detecting a nearby wireless communication device, a connection process to the nearby wireless communication device detected in the detection process, and communication of content data including a current attribute information with the nearby wireless communication device connected in the connection process, wherein the attribute information contains an identifier and an update time of the content data,
compare the previous attribute information with the current attribute information,
determine one of the content data in the storage medium or content data in the nearby wireless communication device has been updated relative to the other when the previous attribute information and the current attribute information do not match, and
control the connection process performed for sharing of content data with the nearby wireless communication device when the update is determined,
wherein the attribute information is communicated using an extension field of a Service Discovery Query in procedures of Service Discovery defined in Wi-Fi Direct, and
wherein the detection process is started at a timing specified by a user.

2. The wireless communication device according to claim 1, wherein the circuitry is further configured to hash attribute information of the content data stored in the storage medium, wherein
the attribute information received from the nearby wireless communication device in the detection process has been hashed, and
the presence or absence of an update is determined by comparing the hashed attribute information received in the detection process with the hashed attribute information.

3. The wireless communication device according to claim 1, wherein
the storage medium further stores history information indicating the last point in time when content data was communicated with the nearby wireless communication device, and
the circuitry is further configured to identify the nearby wireless communication device from a device ID included in the information received in the detection process, and determine if the content data in the storage medium has been updated since the last point in time concerning the nearby wireless communication device indicated by the history information.

4. The wireless communication device according to claim 1, wherein
the circuitry is further configured to, when the presence of an update has been determined, initiate a transmission to the nearby wireless communication device of update notification information indicating the presence of the update, and control the connection process in accordance with a connection request transmitted from the nearby wireless communication device based on reception of the update notification information.

5. The wireless communication device according to claim 4, wherein the update notification information is communicated using an extension field of a Service_Discovery_Query in procedures of Service_Discovery defined in Wi-Fi Direct.

6. The wireless communication device according to claim 1, wherein
the circuitry is further configured to, when the presence of an update has been determined, initiate a transmission of a connection request to the nearby wireless communication device, and control the connection process started upon transmission of the connection request.

7. The wireless communication device according to claim 1, wherein
the wireless communication device operates as a master device of a wireless network, and
the circuitry is further configured to, when the presence of an update has been determined, initiate a request for the nearby wireless communication device to join the wireless network.

8. The wireless communication device according to claim 1, wherein the circuitry is further configured to, when the presence of an update has been determined, initiate a notification to the user of the update, wherein the connection process is controlled in accordance with a check operation of the user performed in response to the notification of the update.

9. The wireless communication device according to claim 1, wherein the detection process is started in accordance with an instruction of a user to start the detection process.

10. The wireless communication device according to claim 9, wherein the detection process is started at predetermined intervals.

11. A non-transitory computer-readable medium having embodied thereon a program, which when executed by a computer causes the computer to execute a method, the method comprising:
controlling a process of detecting a nearby wireless communication device;
controlling a connection process to the nearby wireless communication device detected in the detection process;
controlling communication of content data including a current attribute information with the nearby wireless communication device connected in the connection process, wherein the attribute information contains an identifier and an update time of the content data; and
storing content data including a previous attribute information described in an attribute of previous content data,
wherein the previous attribute information is compared with the current attribute information, one of the stored content data or content data in the nearby wireless communication device is determined to have been updated relative to the other when the previous attribute information and the current attribute information do not match, and the connection process is controlled to be performed for sharing of content data with the nearby wireless communication device when the update is determined,
wherein the attribute information is communicated using an extension field of a Service Discovery Query in procedures of Service Discovery defined in Wi-Fi Direct, and
wherein the detection process is started at a timing specified by a user.

12. A wireless communication system comprising:
a first wireless communication device; and
a second wireless communication device, the second wireless communication device including
a computer-readable storage medium configured to store content data including a previous attribute information described in an attribute of previous content data; and
circuitry configured to
control a process of detecting the first wireless communication device, a connection process to the first wireless communication device detected in the detection process, and communication of content data including a current attribute information with the first wireless communication device connected in the connection process, wherein the attribute information contains an identifier and an update time of the content data,
compare the previous attribute information with the current attribute information,
determine one of the content data in the storage medium or content data in the first wireless communication device has been updated relative to the other when the previous attribute information and the current attribute information do not match, and
control the connection process performed for sharing of content data with the first wireless communication device when the update is determined,
wherein the attribute information is communicated using an extension field of a Service Discovery Query in procedures of Service Discovery defined in Wi-Fi Direct, and
wherein the detection process is started at a timing specified by a user.

13. A wireless communication device comprising:
a computer-readable storage medium configured to store content data including a previous attribute information described in an attribute of previous content data; and
circuitry configured to
control a process of detecting a nearby wireless communication device, a connection process to the nearby wireless communication device detected in the detection process, and communication of content data including a current attribute information with the nearby wireless communication device connected in the connection process, wherein the attribute information contains an identifier and an update time of the content data,
receive, on the basis of the current attribute information transmitted to the nearby wireless communication device detected in the detection process, the previous attribute information described in payload information of the transmitted information and indicating or representative of an update having occurred from the nearby wireless communication device, and
control the connection process performed for sharing of content data with the nearby wireless communication device when one of the content data in the storage medium or content data in the nearby wireless communication device has been updated relative to the other when the current attribute information and the previous attribute information do not match,
wherein the attribute information is communicated using an extension field of a Service Discovery Query in procedures of Service Discovery defined in Wi-Fi Direct, and
wherein the detection process is started at a timing specified by a user.

* * * * *